(12) United States Patent
Zhang et al.

(10) Patent No.: US 12,515,507 B2
(45) Date of Patent: Jan. 6, 2026

(54) QUICK-SWAPPING BATTERY PACK AND ELECTRIC VEHICLE COMPRISING THE SAME

(71) Applicants: AULTON NEW ENERGY AUTOMOBILE TECHNOLOGY CO., LTD., Guangdong (CN); SHANGHAI DIANBA NEW ENERGY TECHNOLOGY CO., LTD., Shanghai (CN)

(72) Inventors: Jianping Zhang, Shanghai (CN); Chunhua Huang, Shanghai (CN)

(73) Assignees: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 230 days.

(21) Appl. No.: 18/034,453

(22) PCT Filed: Nov. 30, 2022

(86) PCT No.: PCT/CN2022/135356
§ 371 (c)(1),
(2) Date: Apr. 28, 2023

(87) PCT Pub. No.: WO2023/098713
PCT Pub. Date: Jun. 8, 2023

(65) Prior Publication Data
US 2024/0351468 A1    Oct. 24, 2024

(30) Foreign Application Priority Data

Nov. 30, 2021 (CN) .......................... 202111444383.8
Dec. 26, 2021 (CN) .......................... 202111606763.7
(Continued)

(51) Int. Cl.
*B60L 53/80* (2019.01)
*B60K 1/04* (2019.01)
(Continued)

(52) U.S. Cl.
CPC ................ *B60K 1/04* (2013.01); *B60L 50/64* (2019.02); *B60L 53/80* (2019.02); *H01M 10/46* (2013.01);
(Continued)

(58) Field of Classification Search
CPC .............. B60K 1/04; B60K 2001/0405; B60K 2001/0438; B60K 2001/0455;
(Continued)

(56) References Cited

U.S. PATENT DOCUMENTS

2009/0000843 A1\* 1/2009 Burchett ................. B60R 16/04
180/68.5
2015/0151624 A1\* 6/2015 Yamada ................... B60K 1/04
180/68.5
(Continued)

FOREIGN PATENT DOCUMENTS

| CN | 112744064 A | 5/2021 |
| CN | 217197745 U | 8/2022 |

(Continued)

OTHER PUBLICATIONS

Feb. 22, 2023 International Search Report issued in International Patent Application No. PCT/CN2022/135356.
(Continued)

*Primary Examiner* — Tisha D Lewis (57) ABSTRACT

The present application discloses a quick-swapping battery pack and an electric vehicle, the quick-swapping battery pack is detachably provided on the longitudinal beam, the top of the quick-swapping battery pack is provided with a groove, the quick-swapping battery pack includes a battery
(Continued)

pack box and an battery cell, the battery pack box is provided with several locking connection structures, several locking connection structures are located in the groove, the battery pack box is provided with several battery cell holding cavities for placing the battery cell, at least some of the battery cell holding cavities are distributed on both sides of the groove, the battery pack box is connected to the longitudinal beam, reducing the center of gravity of the battery pack and increasing the stability of the battery pack, and enhancing a larger space for vehicle smoothness and safety.

20 Claims, 6 Drawing Sheets (30) Foreign Application Priority Data

Dec. 26, 2021 (CN) .......................... 202111606781.5
Dec. 31, 2021 (CN) .......................... 202111673971.9

(51) Int. Cl.
*B60L 50/64* (2019.01)
*H01M 10/46* (2006.01)
*H01M 50/204* (2021.01)
*H01M 50/209* (2021.01)
*H01M 50/244* (2021.01)
*H01M 50/249* (2021.01)
*H01M 50/262* (2021.01)
*H01M 50/264* (2021.01)
*H01M 50/271* (2021.01)
*H01M 50/289* (2021.01)
*H01M 50/242* (2021.01)

(52) U.S. Cl.
CPC ....... *H01M 50/204* (2021.01); *H01M 50/209* (2021.01); *H01M 50/244* (2021.01); *H01M 50/249* (2021.01); *H01M 50/262* (2021.01); *H01M 50/264* (2021.01); *H01M 50/271* (2021.01); *H01M 50/289* (2021.01); *B60K 2001/0405* (2013.01); *B60K 2001/0438* (2013.01); *B60K 2001/0455* (2013.01); *B60K 2001/0472* (2013.01); *H01M 50/242* (2021.01); *H01M 2220/20* (2013.01)

(58) Field of Classification Search
CPC . B60K 2001/0472; B60L 50/64; B60L 53/80; B60L 50/66; H01M 10/46; H01M 50/204; H01M 50/209; H01M 50/244; H01M 50/249; H01M 50/262; H01M 50/264; H01M 50/271; H01M 50/289; H01M 50/242; H01M 2220/20; H01M 50/20; B60S 5/06
See application file for complete search history.

(56) References Cited

U.S. PATENT DOCUMENTS

| 2015/0239331 | A1 | 8/2015 | Rawlinson et al. | |
| 2017/0305249 | A1* | 10/2017 | Hara | ................. B62D 25/2036 |
| 2022/0021056 | A1* | 1/2022 | Sloan | ........................ B60K 1/04 |
| 2022/0111716 | A1* | 4/2022 | Mckibben | ............... B60L 50/62 |
| 2022/0242215 | A1* | 8/2022 | Sloan | .................. B62D 25/088 |

FOREIGN PATENT DOCUMENTS

| CN | 217227277 U | 8/2022 | | |
| CN | 217227334 U | 8/2022 | | |
| CN | 115284853 A | 11/2022 | | |
| CN | 115303115 A | 11/2022 | | |
| GB | 2591276 A | * | 7/2021 | ............. B60L 53/80 |

OTHER PUBLICATIONS

Feb. 22, 2023 Written Opinion of the International Searching Authority issued in International Patent Application No. PCT/CN2022/135356.

* cited by examiner

QUICK-SWAPPING BATTERY PACK AND ELECTRIC VEHICLE COMPRISING THE SAME

REFERENCE TO SEQUENCE LISTING

This application is a National Stage of International Application No. PCT/CN2022/135356, filed on Nov. 30, 2022, which claims the priority of Chinese patent application CN2021116067815 with a filing date of Dec. 26, 2021, the priority of Chinese patent application CN2021116067637 with a filing date of Dec. 26, 2021, the priority of Chinese patent application CN2021114443838 with a filing date of Nov. 30, 2021, and the priority of the Chinese patent application CN2021116739719 with a filing date of Dec. 31, 2021. This application cites the full text of the above-mentioned Chinese patent application.

TECHNICAL FIELD

The present disclosure relates to the technical field of battery swapping, in particular to a quick-swapping battery pack and electric vehicle comprising the same.

BACKGROUND

In recent years, new energy vehicles have developed rapidly. Electric vehicles that rely on storage batteries as driving energy sources have the advantages of zero emission and low noise. With the increasing market share and frequency of use of electric vehicles, electric commercial vehicles, such as electric heavy trucks and electric light trucks, have gradually been widely used at present, and the battery swapping technology has gradually been applied to the field of commercial vehicles.

At present, the battery packs on electric trucks are generally arranged above the longitudinal beam of the vehicle body, and the direct charging battery packs or quick-swapping battery packs are installed on the longitudinal beam, and the longitudinal beam is used for supporting the battery packs. Due to the high position of the longitudinal beam of the vehicle body on the electric truck relative to the ground and the heavy weight of the battery pack, it makes the centre of gravity of the battery pack higher, and less stable relative to the vehicle, thus affecting the safety of the vehicle driving, and taking up more space behind the driver, which is a poor driving experience for the driver. In addition, as the battery pack is set above the longitudinal beam, the battery pack can only be replaced by means of a lifting structure, and with a lifting structure, the overall building of the battery swapping station is high, covering a large area, with high maintenance costs and poor safety.

CONTENT OF THE PRESENT INVENTION

The technical problem to be solved by the present disclosure is to provide a quick-swapping battery pack and an electric vehicle comprising the same, in order to overcome the defects of the prior art where the battery pack has a high center of gravity, is less stable relative to the vehicle and takes up more space behind the driver, which is a poor driving experience for the driver.

The present disclosure solves the above technical problem by means of the following technical solutions:

A quick-swapping battery pack, which is removably provided on a longitudinal beam of an electric vehicle, the top of the quick-swapping battery pack is provided with a groove, the quick-swapping battery pack comprises a battery pack box and an battery cell, the battery pack box is provided with a plurality of locking connection structures, a plurality of the locking connection structures are located in the groove, the battery pack box is provided with a plurality of battery cell accommodating cavities for placing the electric cell, at least some of the battery cell accommodating cavities are distributed on both sides of the groove, and the battery pack box is connected to the longitudinal beam by a plurality of the locking connection structures.

In this solution, the above structure form is adopted to realize that the center of gravity of the battery pack is below the longitudinal beam, which can effectively reduce the center of gravity of the battery pack, increase the stability of the battery pack, and enhance a larger space for the vehicle smoothness and safety. The locking connection structure is located in a groove on the top of the battery pack, making the connection between the battery pack and the longitudinal beam more stable. At the same time, at least some of the battery cell accommodating cavities are distributed on both sides of the groove, so that the battery cell accommodating cavities inside the battery pack box are extending along the width direction of the electric vehicle and used for accommodating the battery cells, making it possible to use the space on both sides of the longitudinal beam to store and accommodate more battery cells, realizing a longer travel distance of the electric vehicle and reducing the replacement times of the electric vehicle: and the structure is compact and the space utilization rate is high, especially in the vertical direction.

Preferably, a plurality of the battery cell accommodating cavities are sequentially arranged at intervals along the horizontal direction.

In this solution, the above-mentioned structural form is adopted to increase the space provided for the battery cell accommodating cavities, further increasing the capacity of the battery cell, realizing a longer travel distance of the electric vehicle, reducing the number of times the electric vehicle is replaced, and the space utilization rate is higher.

Preferably, a plurality of the battery cell accommodating cavities comprises a plurality of side battery cell accommodating cavities, a plurality of the side battery cell accommodating cavities are distributed on either side of the groove.

In this solution, the above-mentioned structural form is adopted to make full use of the space on both sides of the longitudinal beam to achieve higher space utilization, especially the space in the vertical direction, and increase the capacity of the battery cells in the quick-swapping battery pack.

Preferably, a plurality of the battery cell accommodating cavities further comprising a central battery cell accommodating cavity, the central battery cell accommodating cavity is located in the middle region of the battery pack box, a plurality of the side battery cell accommodating cavities are distributed on either side of the central battery cell accommodating cavity, the groove is formed between the central battery cell accommodating cavity and the side battery cell accommodating cavities.

In this solution, the above-mentioned structural form is adopted, so that the space of the longitudinal beam of the electric vehicle is further fully utilized, and the battery cells can be installed on both sides and the middle of the longitudinal beam, so that the space utilization rate is higher and increasing the capacity of the battery cell in the quick-swapping battery pack. At the same time, the groove is located between the central battery cell accommodating cavity and the side cell storage cavities, which facilitates the setting of the groove.

Preferably, the height of the central battery cell accommodating cavity is less than the height of the side battery cell accommodating cavities.

In this solution, adopting the above-mentioned structural form, there will be an avoidance space for avoiding the longitudinal beams between the central battery cell accommodating cavity and the side battery cell accommodating cavities on both sides, effectively avoiding interference: at the same time, the side battery cell accommodating cavities extend vertically relative to the central battery cell accommodating cavity, thereby further making full use of the space in the height direction of the electric vehicle, achieving higher space utilization, and increasing the capacity of the battery cells in the quick-swapping battery pack.

Preferably, a plurality of the locking connection structures are respectively provided on the side wall of the groove and are used for connecting to the side wall of the longitudinal beam;

and/or, the locking connection structure is provided at the bottom of the groove and is used for connecting to the bottom of the longitudinal beam.

In this solution, the use of the above-mentioned structure form allows the locking connection structure to be set up according to the space, with high space utilization.

Preferably, the groove is used for avoiding the longitudinal beam.

In this solution, the above-mentioned structural form is adopted, which has a compact structure and a high space utilization rate. At the same time, interference phenomena are effectively avoided and the stability is higher.

Preferably, the lock connection structure is a locking shaft or a hooking piece, and the locking shaft or the hooking piece is connected into the connection groove of the longitudinal beam.

In this solution, the above-mentioned structure is adopted, and it is convenient to connect into the connection groove of the longitudinal beam by means of the locking shaft or the hooking piece, and the structure is simple, and the processing is convenient.

Preferably, the locking shaft extends from the side wall of the groove towards the middle of the quick-swapping battery pack.

In this solution, the above-mentioned structural form is adopted, the structure is simple, and the installation and setting are convenient.

Preferably, the two ends of a plurality of locking shafts are respectively connected to the two inner walls of the groove.

In this solution, the above-mentioned structural form is adopted, and the two ends of the locking shaft are connected with the two inner walls of the groove to realize bilateral suspension, so that the locking shaft is stably connected to the groove of the quick-swapping battery pack, effectively preventing the locking shaft from being shaking phenomenon occurs in the groove, which greatly improves the stability of the quick-swapping battery pack in the locked state, prevents the quick-swapping battery pack from shaking during the use of the electric vehicle, and improves the safety and stability of the electric vehicle.

Preferably, the hooking piece comprises a threaded portion or a stopper portion.

In this solution, the above-mentioned structural form is adopted, and the installation and connection forms of the locking connection structure are diversified, and the locking between the hooking piece and the longitudinal beam can be realized only along the vertical direction, and the connection is more stable.

Preferably, the quick-swapping battery pack further includes a mounting bracket, and a plurality of locking connection structures are all arranged on the mounting bracket and installed on the battery pack box by means of the mounting bracket.

In this solution, the above-mentioned structural form is adopted to facilitate the installation of a plurality of locking connection structures, and the installation accuracy is high; at the same time, the strength of the quick-swapping battery pack is improved and the stability is higher.

Preferably, the quick-swapping battery pack further includes a plurality of guiding and positioning mechanisms, and a plurality of the guiding and positioning mechanisms are arranged on the battery pack box.

In this solution, the above-mentioned structure is adopted, and the guiding and positioning mechanism has a guiding and positioning function. The quick-swapping battery pack can be aligned under the force of the guiding and positioning of the guiding and positioning mechanism, thereby realizing precise positioning, installation and removal of the quick-swapping battery pack more stable.

Preferably, a plurality of guiding and positioning mechanisms are arranged on the side wall of the groove.

In this solution, the above-mentioned structural form is adopted to realize the utilization of the space in the groove. At the same time, by means of a plurality of guiding and positioning mechanisms, the opening of the groove is precisely aligned with the longitudinal beam conveniently, and the installation accuracy is higher.

Preferably, a plurality of guiding and positioning mechanisms comprise a plurality of initial positioning mechanisms, and a plurality of initial positioning mechanisms are respectively arranged at intervals on the battery pack box, and a plurality of the initial positioning mechanisms provide initial positioning guidance for the quick-swapping battery pack, so that the opening of the groove is aligned with the longitudinal beam.

In this solution, the above-mentioned structural form is adopted, and a plurality of initial positioning mechanisms cooperate with the longitudinal beams to provide initial positioning guidance for the quick-swapping battery pack, so that the opening of the groove can be accurately aligned with the longitudinal beam and smoothly sleeved on the longitudinal beam, improving security and stability.

Preferably, a plurality of initial positioning mechanisms are located on the same side as a plurality of locking connection structures.

In this solution, the above-mentioned structural form is adopted to realize the precise positioning of the locking connection structure after the initial positioning guidance, and improve the safety and stability.

Preferably, a plurality of guiding and positioning mechanisms comprise a plurality of precise positioning mechanisms, and a plurality of precise positioning mechanisms are respectively arranged on the battery pack box at intervals, and a plurality of the precise positioning mechanisms perform precise positioning guidance on the quick-swapping battery pack, so as to position the quick-swapping battery pack on the longitudinal beam.

In this solution, the above-mentioned structural form is adopted, and multiple precise positioning mechanisms cooperate with the longitudinal beams to guide the quick-swapping battery pack to achieve precise positioning guidance, the locking accuracy is higher; at the same time, it effectively avoids the misalignment and dislocation of the quick-swapping battery pack during use, which greatly improves the safety and stability.

Preferably, the multiple precise positioning mechanisms and the multiple initial positioning mechanisms are respectively located on opposite sides.

In this solution, adopting the above-mentioned structural form, multiple precise positioning mechanisms and multiple initial positioning mechanisms located on opposite sides will respectively against and force on the opposite sides of the longitudinal beam, thereby effectively limiting the offset of the longitudinal beam in the horizontal direction, and the safety and stability are higher.

Preferably, the guiding and positioning mechanism is an elastic positioning mechanism.

In this solution, the above-mentioned structural form is adopted, and the elastic positioning mechanism will provide clamping force to the longitudinal beam, which effectively prevents the quick-swapping battery pack from being greatly displaced during use, and improves safety and stability.

Preferably, the bottom of the battery pack box is provided with a plurality of unlocking guiding grooves, the unlocking guiding grooves penetrate from the bottom of the battery pack box to the groove, and the unlocking guiding groove is used for allowing unlocking device to pass through to realize the unlocking of the locking connection structure, or allowing the locking mechanism on the longitudinal beam to pass downward through the unlocking guiding groove to realize the unlocking of the locking connection structure by the unlocking device.

In this solution, adopting the above-mentioned structural form, there will be an unlocking space for the locking connection structure by means of the unlocking guiding groove, and the unlocking lever on the unlocking device will pass through the unlocking guiding groove and act on the locking connection structure or the locking mechanism to realize unlocking, so as to realize unlocking conveniently.

Preferably, the bottom of the unlocking guiding groove has an inclined guiding surface.

In this solution, the above-mentioned structural form is adopted, and the inclined guiding surface has a slip guiding function, and the unlocking lever on the unlocking device can be smoothly inserted into the unlocking guiding groove by means of the inclined guiding surface, thereby ensuring the stability of unlocking.

Preferably, the battery pack box is also provided with a plurality of wire passage slots for cable routing, the wire passage slot is located below the groove, and is connected to the two adjacent battery cell accommodating cavities.

In this solution, the above-mentioned structural form is adopted, so that the battery cells in two adjacent battery cell accommodating cavities will be electrically connected by cables, and the installation and connection are very convenient; meanwhile, the structure is simple and the processing is convenient.

Preferably, the top of the battery cell accommodating cavity is provided with an opening, and the quick-swapping battery pack also includes a box cover, which is connected to the battery pack box and used for covering the opening of the battery cell accommodating cavity.

In this solution, the above-mentioned structural form is adopted, it is easy to install and set up the battery cells on the battery cell accommodating cavity through the opening, and then cover the battery cells in the battery pack box through the box cover, which is convenient for installation and setting, and has high stability.

Preferably, the groove is located between two adjacent openings.

In this solution, the above-mentioned structural form is adopted, and the groove is arranged between the openings of two adjacent battery cell accommodating cavities, and the structural space between the openings is reused, so that the quick-swapping battery pack has a compact structure and a high space utilization rate.

An electric vehicle comprises the quick-swapping battery pack as described above.

In this solution, the above-mentioned structural form is adopted, setting the quick-swapping battery pack on the chassis of the electric vehicle, so that the center of gravity of the quick-swapping battery pack is below the longitudinal beam, which can effectively reduce the center of gravity of the quick-swapping battery pack and increase the stability of quick-swapping battery pack, which has a large space to improve the smoothness and safety of the vehicle. The locking connection structure is set in the groove on the top of the battery pack, making the connection between the battery pack and the longitudinal beam more stable. At the same time, at least some of the battery cell accommodating cavities are distributed on both sides of the groove, so that the battery cell accommodating cavities inside the battery pack box are extending along the width of the electric vehicle and used for accommodating the battery cells, making it possible to use the space on both sides of the longitudinal beam to store and accommodate more battery cells, realizing a longer travel distance of the electric vehicle and reducing the replacement times of the electric vehicle; and the structure is compact and the space utilization rate is high, especially in the vertical direction.

On the basis of conforming to common knowledge in the field, the above-mentioned preferred conditions can be combined arbitrarily to obtain preferred examples of the present disclosure.

The positive progress effect of the present disclosure is:

In the quick-swapping battery pack and electric vehicle comprising the same of the present disclosure, the quick-swapping battery pack is connected to the longitudinal beam by means of the locking connection structure in the top groove, so that the connection between the battery pack and the longitudinal beam is more stable; the quick-swapping battery pack is set on the chassis of electric vehicle, realizing the chassis battery swapping of the electric vehicle, which reduces the risk of failure in the process of battery swapping and improves safety. Moreover, the chassis battery swapping system occupies a small area and the promotion cost of the battery swapping station is low; the center of gravity of the quick-swapping battery pack is below the longitudinal beam, which can effectively reduce the center of gravity of the quick-swapping battery pack and increase the stability of quick-swapping battery pack, which has a large space to improve the smoothness and safety of the vehicle. At the same time, at least some of the battery cell accommodating cavities are distributed on both sides of the groove, making it possible to use the space on both sides of the longitudinal beam to store and accommodate more battery cells, realizing a longer travel distance of the electric vehicle and reducing the replacement times of the electric vehicle: and the structure is compact and the space utilization rate is high, especially in the vertical direction.

DESCRIPTION OF REFERENCE NUMERALS battery pack box 1
side battery cell accommodating cavity 11
central battery cell accommodating cavity 12
unlocking guiding groove 13
wire passage slot 14
battery cell 2
groove 3
locking connection structure 4
mounting bracket 5
initial positioning mechanism 6
precise positioning mechanisms 7
box cover 8
electrical connector 9
quick-swapping battery pack 100
longitudinal beam 200

DETAILED DESCRIPTION OF THE PREFERRED EMBODIMENT

The present disclosure will be more clearly and completely described below by means of embodiments and in conjunction with the accompanying drawings, but the present disclosure is not limited to the scope of the embodiments.

As shown in FIGS. 1 to 6, this embodiment discloses an electric vehicle, which is a commercial vehicle such as a heavy truck or light truck, and the electric vehicle includes a quick-swapping battery pack 100. The quick-swapping battery pack 100 is removable arranged on the two longitudinal beams 200 of the electric vehicle, the top of the quick-swapping battery pack 100 is provided with a groove 3, and the quick-swapping battery pack 100 includes a battery pack box 1 and an battery cell 2, and a plurality of locking connection structures 4 are provided on the battery pack box 1, and a plurality of locking connection structures 4 are all located in the groove 3, and a plurality of battery cell accommodating cavities for placing the battery cells 2 are arranged in the battery pack box 1, at least some of the battery cell accommodating cavities are distributed on both sides of the groove 3, and the battery pack box 1 is connected to the longitudinal beam 200 by means of a plurality of locking connection structures 4.

By providing the groove 3 at the top of the quick-swapping battery pack 100, the quick-swapping battery pack 100 moves to the battery swapping position below the longitudinal beam 200, and by means of the quick-swapping battery pack 100 moving upward, thereby realizing that the longitudinal beam 200 is embedded in the groove 3. The quick-swapping battery pack 100 is connected with the longitudinal beam 200 by means of a plurality of locking connection structures 4 in the groove 3, so that the quick-swapping battery pack 100 is installed on the longitudinal beam 200, and the connection between the quick-swapping battery pack 100 and the longitudinal beam 200 is more stable. Otherwise, the quick-swapping battery pack 100 is detached from the longitudinal beam 200. Realizing the chassis battery swapping of the electric vehicle, which reduces the risk of failure in the process of battery swapping and improves safety. Moreover, the chassis battery swapping system occupies a small area and the promotion cost of the battery swapping station is low; in addition, the center of gravity of the quick-swapping battery pack 100 is below the longitudinal beam 200, which can effectively reduce the center of gravity of the quick-swapping battery pack 100 and increase the stability of quick-swapping battery pack 100, which has a large space to improve the smoothness and safety of the vehicle.

At the same time, at least some of the battery cell accommodating cavities in the battery pack box 1 are distributed on both sides of the groove 3, and a plurality of battery cell accommodating cavities are arranged at intervals sequentially along the horizontal direction, specifically, including a plurality of side battery cell accommodating cavities 11, and a plurality of side battery cell accommodating cavities 11 are distributed on both sides of the groove 3, and the battery cells 2 placed in a plurality of side battery cell accommodating cavities 11 will be distributed on both sides of the longitudinal beam 200, making full use of the space on both sides of the longitudinal beam 200. The battery cell accommodating cavity in the battery pack box 1 is extended along the width direction of the electric vehicle and is used for accommodating the battery cell 2, and the space on both sides of the longitudinal beam 200 is used for arranging the battery cell accommodating cavity, so that the space set by the battery cell accommodating cavity is increased, which can store and accommodate more battery cells 2, further increasing the capacity of the battery cell 2, realizing the electric vehicle travel farther, and reduce the replacement times of electric vehicles: and the structure is compact and the space utilization rate is high, especially in the vertical direction on the space.

Figure 5:
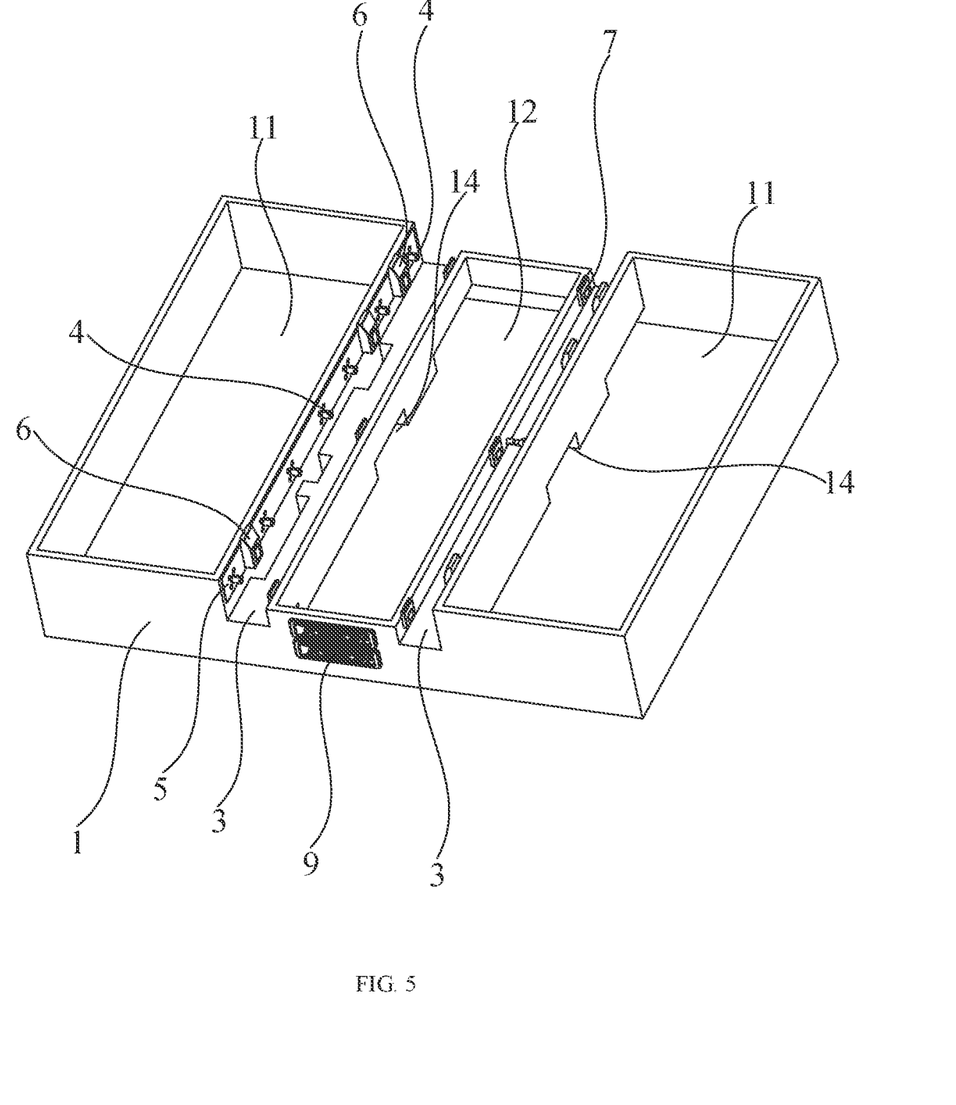
FIG. 5 is a partial structural schematic diagram of a quick-swapping battery pack according to an embodiment of the present disclosure.

In this embodiment, preferably, as shown in FIG. 5, the battery pack box 1 also includes a central battery cell accommodating cavity 12, the central battery cell accommodating cavity 12 is provided in the middle region of the battery pack box 1, two side battery cell accommodating cavities 11 are distributed on both sides of the central battery cell accommodating cavity 12, and a groove 3 is formed between the central battery cell accommodating cavity 12 and the side battery cell accommodating cavity 11.

There are a plurality of transverse beams connected between the two longitudinal beams 200, the central battery cell accommodating cavity 12 are located below the transverse beams and between the two longitudinal beams 200, and the side battery cell accommodating cavities 11 are distributed on the backward sides of the two longitudinal beams 200, thus further making full use of the space between the two longitudinal beams 200 of the electric vehicle, realizing that the battery cells 2 can be installed on both sides and in the middle of the longitudinal beams 200 respectively, achieving higher space utilization, especially in the vertical direction, and increasing the capacity of the battery cells 2 in the quick-swapping battery pack 100. At the same time, the groove 3 is located between the central battery cell accommodating cavity 12 and the side battery cell accommodating cavity 11, which facilitates the setting of the groove 3.

The height of the central battery cell accommodating cavity 12 is smaller than the height of the side battery cell accommodating cavity 11. An avoidance space for avoiding the longitudinal beam 200 will be formed between the central battery cell accommodating cavity 12 and the side battery cell accommodating cavities 11 on both sides, so as to effectively avoid interference: at the same time, the side battery cell accommodating cavities 11 extend in the vertical direction relative to the central battery cell accommodating cavity 12, thereby further fully utilizing the space in the height direction of the electric vehicle, achieving higher space utilization, and increasing the capacity of the battery cells 2 in the quick-swapping battery pack 100.

In other embodiments, the quick-swapping battery pack 100 has two side battery cell accommodating cavities 11, and the groove is located between the two side battery cell accommodating cavities 11.

Wherein, the groove 3 is used for avoiding the longitudinal beam 200. The quick-swapping battery pack 100 moves to the battery swapping position below the longitudinal beam 200, so that the opening of the groove 3 is aligned with the longitudinal beam 200, and the quick-swapping battery pack 100 will move upward in the vertical direction, so as to realize that the longitudinal beam 200 is embedded in the groove 3, the structure is compact, the space utilization rate is high, and at the same time, the interference phenomenon is effectively avoided, and the stability is higher. In this embodiment, the groove 3 penetrates through the quick-swapping battery pack 100 along the length direction of the electric vehicle.

In one embodiment, a plurality of locking connection structures 4 are respectively provided on the side wall of the groove 3 and used for connecting with the side wall of the longitudinal beam 200.

In other embodiments, the locking connection structure 4 is provided at the bottom of the groove 3 and used for connecting with the bottom of the longitudinal beam 200. The locking connection structure 4 can be set according to the space, and the space utilization rate is high.

The locking connection structure 4 is a locking shaft or a hooking piece, and the locking shaft or the hooking piece is connected in the connection groove of the longitudinal beam 200. When locking, the locking shaft or the hooking piece will be connected in the connection groove of the longitudinal beam 200, so as to realize locking the quick-swapping battery pack 100 on the longitudinal beam 200. When unlocking, the locking shaft or the hooking piece will move out of the connection groove, so that the locking connection structure 4 and the longitudinal beam 200 can be disengaged from each other, thereby realizing the unlocking of the quick-swapping battery pack 100 and the longitudinal beam 200. It is convenient to be connected in the connection groove of the longitudinal beam 200 by means of the locking shaft or the hooking piece, and the structure is simple, and the processing is convenient.

Figure 1:
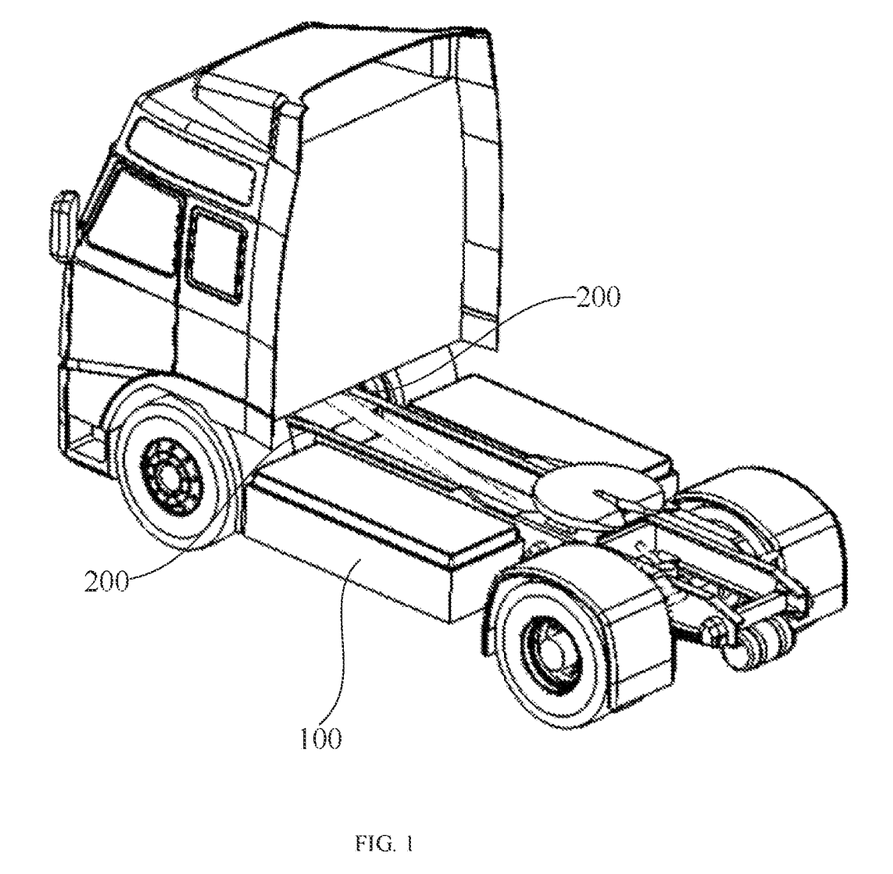
FIG. 1 is a schematic structural diagram of an electric vehicle according to an embodiment of the present disclosure.
Figure 2:
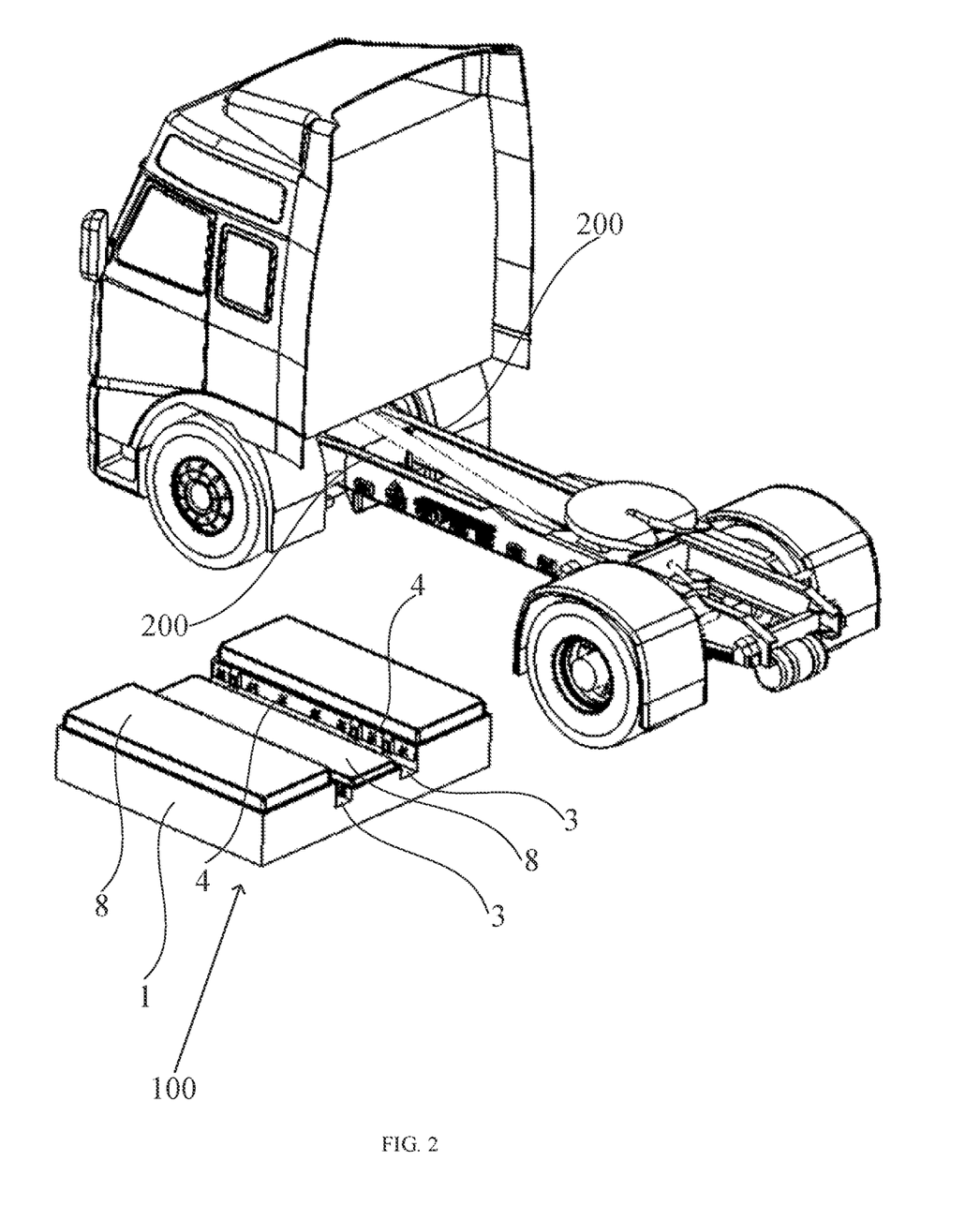
FIG. 2 is a schematic diagram of an exploded structure of an electric vehicle according to an embodiment of the present disclosure.
Figure 3:
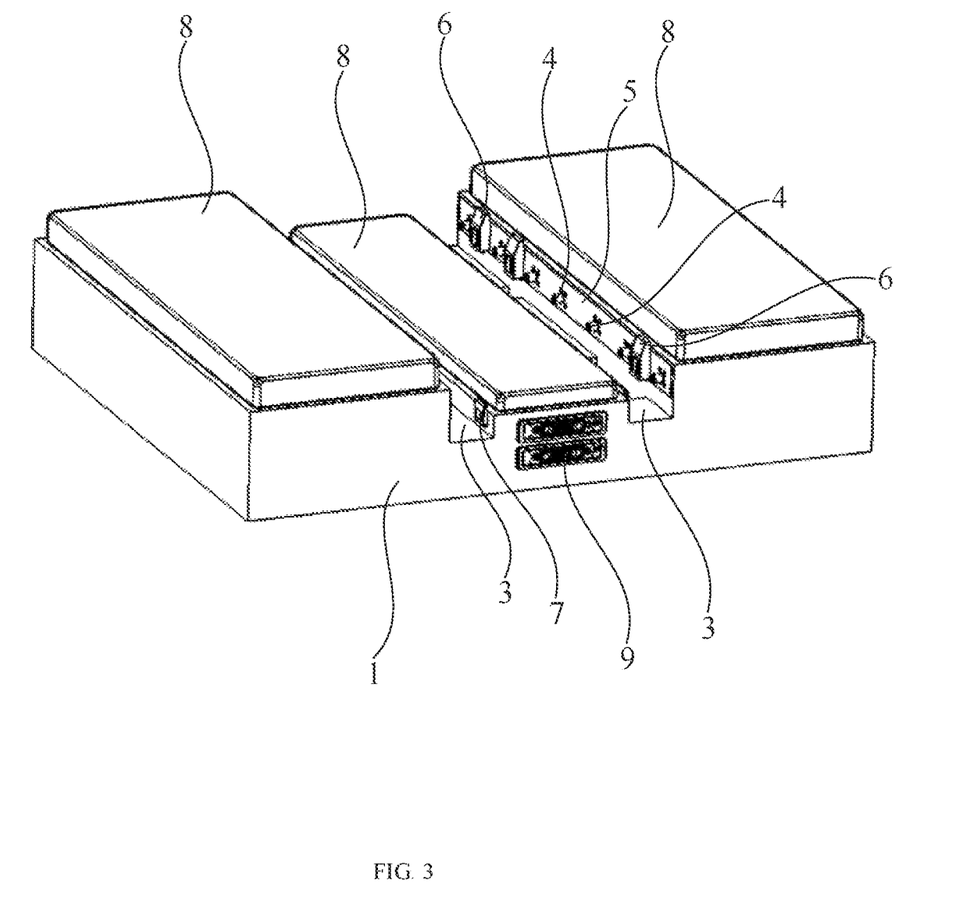
FIG. 3 is a schematic structural diagram of a quick-swapping battery pack according to an embodiment of the present disclosure.

In this embodiment, as shown in FIG. 3, the locking connection structure 4 is a locking shaft, and the locking shaft extends from the side wall of the groove 3 to the middle of the battery pack. The opening of the connection groove faces the outside of the longitudinal beam 200, one end of the locking shaft is connected to the battery pack box 1, and the other end is inserted into the connection groove to realize locking. The structure is simple, and the installation is convenient.

In other embodiments, the locking connection structure 4 is a locking shaft, and the two ends of a plurality of locking shafts are respectively connected to the two inner walls of the groove 3. The connection groove is a through groove, the two ends of the locking shaft are respectively connected to the two inner walls of the groove 3, and the middle area of the locking shaft will be inserted into the connection groove to realize locking. Both ends of the locking shaft are connected to the battery pack box 1, and the locking shaft realizes bilateral suspension, so that the locking shaft is stably connected in the groove 3 of the quick-swapping battery pack 100, effectively avoiding shaking of the locking shaft in groove 3, greatly improving the stability of the quick-swapping battery pack 100 in the locked state, preventing the quick-swapping battery pack 100 from shaking in the process of using the electric vehicle, and improving the safety and stability of the electric vehicle.

In other embodiments, the locking connection structure 4 is a hooking piece, and the hooking piece includes a first threaded portion or a stopper portion. The connection groove of the longitudinal beam 200 extends in the vertical direction and the connection groove is set downward, and the second thread portion or the limiting portion is provided in the connection groove to cooperate with the first thread portion or the stopper portion, so as to realize that the locking connection structure 4 and the longitudinal beam 200 can be connected and locked, or dispatched and unlocked in the vertical direction. By adopting the locking structure form, the locking between the locking connection structure and the connection groove can be realized only along the vertical direction, and the installation and connection forms are diversified, the connection is more stable and the structural space utilization rate is high.

Of course, in other embodiments, the locking connection structure 4 and the longitudinal beam 200 cooperate with each other through any one of screw connection, clip connection, buckle connection, plug connection, hook connection, and tenon connection to achieve the quick-swapping battery pack 100 mounted on the longitudinal beam 200.

As shown in FIG. 3, the quick-swapping battery pack 100 also includes a mounting bracket 5, and a plurality of locking connection structures 4 are all arranged on the mounting bracket 5 and are mounted on the battery pack box 1 by means of the mounting bracket 5. When it is necessary to install a plurality of locking connection structures 4 on the battery pack box 1, by first arranging a plurality of locking connection structures 4 on the mounting bracket 5 to form a whole, and then the whole mounting bracket 5 is installed on the battery pack box 1, so that the installation of a plurality of locking connection structures 4 is convenient and the installation accuracy is high; at the same time, the strength of the quick-swapping battery pack 100 is improved and the stability is higher.

The quick-swapping battery pack 100 also includes a plurality of guiding and positioning mechanisms, and the plurality of guiding and positioning mechanisms are arranged on the battery pack box 1. The guiding and positioning mechanism has a guiding and positioning function, and the battery pack box 1 can be straightened under the force of the guiding and positioning of the guiding and positioning mechanism, so as to realize precise positioning, and the installation and disassembly of the quick-swapping battery pack 100 is more stable.

In this embodiment, a plurality of guiding and positioning mechanisms are provided on the side wall of the groove 3. A plurality of locking connection structures 4 and a plurality of guiding and positioning mechanisms are all provided in the groove 3 to realize the utilization of the space in the groove 3. At the same time, the precise alignment of the opening of the groove 3 and the longitudinal beam 200 will be facilitated by a plurality of guiding and positioning mechanisms, and the installation accuracy will be higher.

As shown in FIG. 3, a plurality of initial positioning mechanisms 6 are respectively arranged at intervals on the battery pack box 1, and are located on the same side as the locking connection structure 4, and a plurality of initial positioning mechanisms 6 provide initial positioning guidance for the battery pack, so that the opening of the groove 3 is aligned with the longitudinal beam 200. A plurality of initial positioning mechanisms 6 cooperate with the longitudinal beam 200 to conduct initial positioning guidance for the battery pack box 1, so that the opening of the groove 3 can be accurately aligned with the longitudinal beam 200 and smoothly sleeved on the longitudinal beam 200, and the safety and stability are improved.

A plurality of guiding and positioning mechanisms include a plurality of precise positioning mechanisms 7, and a plurality of precise positioning mechanisms 7 are respectively arranged at intervals on one side of the battery pack box 1 opposite to a plurality of initial positioning mechanisms 6, and a plurality of precise positioning mechanisms 7 perform precise positioning guidance on the quick-swapping battery pack 100 to position the battery pack box 1 on the longitudinal beam 200. After the quick-swapping battery pack 100 has passed the initial positioning step, the groove 3 will be sleeved on the longitudinal beam 200, and the precise positioning step starts, and the battery pack box 1 is precise positioning guidance by means of the mutual cooperation of multiple precise positioning mechanisms 7 and the longitudinal beam 200, so that a plurality of locking connection structures 4 located in the groove 3 are inserted into the connection groove of the longitudinal beam 200, and the locking accuracy is higher; at the same time, it effectively avoids the deviation of the quick-swapping battery pack 100 during use, and the safety and stability are greatly improved.

The longitudinal beam 200 is embedded in the groove 3, multiple precise positioning mechanisms 7 and multiple initial positioning mechanisms located on opposite sides will respectively bear against the force on the opposite sides of the longitudinal beam, thereby effectively limiting the offset of the longitudinal beam 200 in the horizontal direction, and the safety and stability are higher.

In this embodiment, the guiding and positioning mechanism is an elastic positioning mechanism. That is, both the precise positioning mechanisms 7 and the initial positioning mechanisms 6 are elastic positioning mechanisms. The elastic positioning mechanism includes a mounting shell, a positioning portion and an elastic component, the mounting shell is fixed on the battery pack box 1, the inside of the mounting shell is provided with a accommodating cavity, and the outer side surface of the mounting shell is provided with an mounting opening communicated with the accommodating cavity, the positioning portion penetrates through the installing opening; the outer side surface of the positioning portion extends out of the installing opening and abuts against the side surface of the longitudinal beam 200; the elastic component acts on the inner side surface of the positioning portion and transmit varying forces between the positioning portion and the mounting shell for providing an outward clamping force to the longitudinal beam 200. Wherein, the top of the outer surface of the mounting shell is provided with a first sliding guiding surface. The top of the positioning portion extending out of the mounting opening is provided with a second sliding guiding surface.

Figure 6:
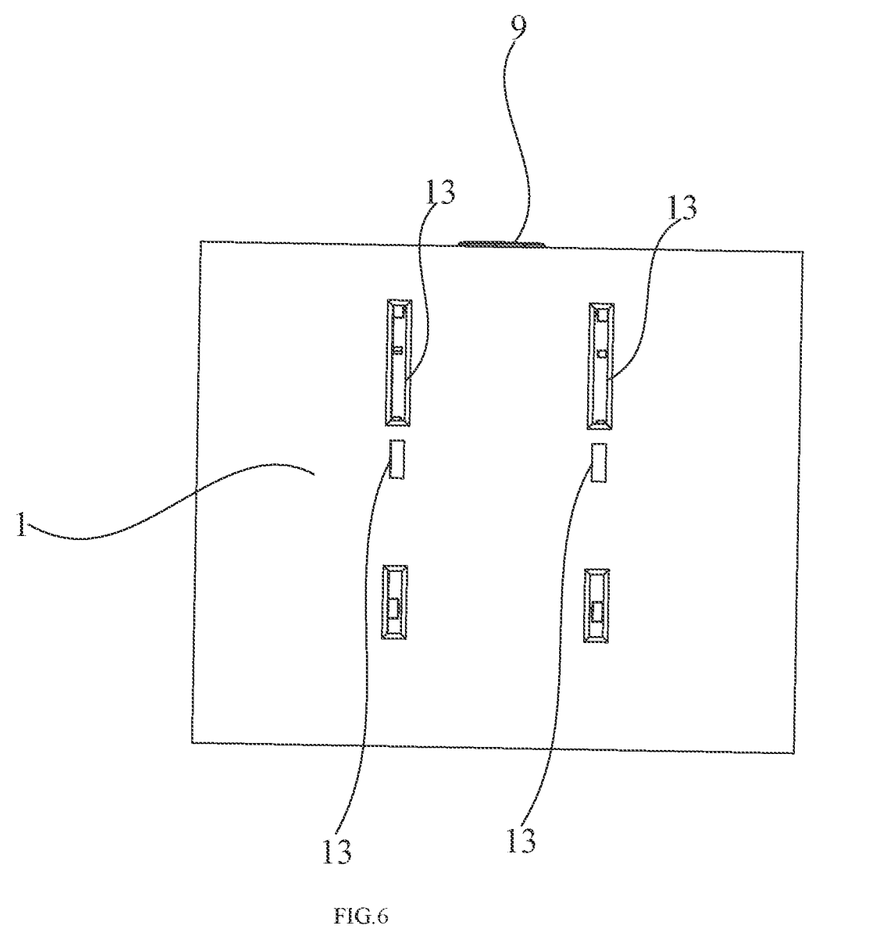
FIG. 6 is a schematic diagram of bottom view of the quick-swapping battery pack according to an embodiment of the present disclosure.

As shown in FIG. 6, the bottom of the battery pack box 1 is provided with a plurality of unlocking guiding grooves 13, the unlocking guiding grooves 13 penetrate from the bottom of the battery pack box 1 to the groove 3, and the unlocking guiding grooves 13 are used for allowing unlocking devices to pass through to realize the unlocking of the locking connection structure 4, or allowing the locking mechanism on the longitudinal beam 200 to pass through the unlocking guiding groove 13 downward to realize the unlocking of the locking connection structure 4 by the unlocking device. Through the unlocking guiding groove 13, there will be an unlocking space for the locking connection structure 4, and the unlocking lever on the unlocking device will pass through the unlocking guiding groove 13 and act on the locking connection structure 4 or the locking mechanism to realize unlocking, so that unlocking is very convenient.

The bottom of the unlocking guiding groove 13 is provided with an inclined guiding surface. The inclined guiding surface has a slip guiding function, and the unlocking lever on the unlocking device can be smoothly inserted into the unlocking guiding groove 13 by means of the inclined guiding surface, thereby ensuring the stability of unlocking.

As shown in FIG. 5, there are a plurality of wire passage slots 14 for cable routing inside the battery pack box 1, the wire passage slot 14 is located below the groove 3 and is connected to the two adjacent battery cell accommodating cavities. The structure of the groove 3 divides the adjacent two battery cell accommodating cavities, and the wire passage slots 14 below the groove 3 will be used for the passage of cables, so that the battery cells 3 in the adjacent two battery cell accommodating cavities will be electrically connected through cables, and the installation and connection are very convenient; at the same time, the structure is simple and the processing and manufacturing are convenient.

Figure 4:
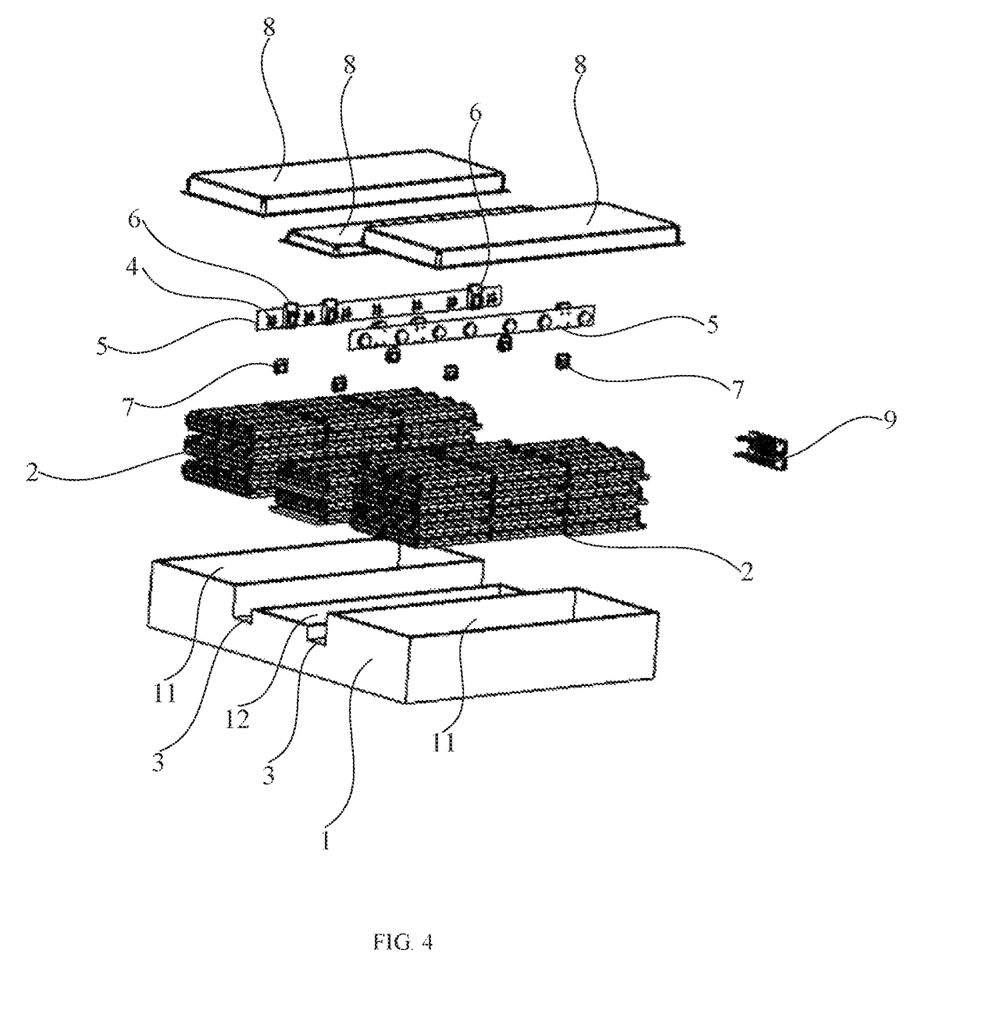
FIG. 4 is a schematic diagram of an exploded structure of a quick-swapping battery pack according to an embodiment of the present disclosure.

As shown in FIG. 4, there is an opening at the top of the battery cell accommodating cavity, and the quick-swapping battery pack 100 also includes a box cover 8, which is connected to the battery pack box 1 and used for covering the opening of the battery cell accommodating cavity. Through the opening, the battery cell 2 is conveniently installed in the battery cell accommodating cavity, and then cover the battery cells 2 in the battery pack box 1 by means of the box cover 8, which is convenient for installation and setting, and has high stability. In this embodiment, the number of battery cell accommodating cavities and the number of box covers 8 are multiple and correspond to each other one by one. Certainly, in other embodiments, the number of the box cover 8 may also be one, and one box cover 8 simultaneously covers the openings of multiple battery cell accommodating cavities.

Wherein, the groove 3 is located between two adjacent openings. The groove 3 is arranged between the openings of two adjacent battery cell accommodating cavities, and the structural space between the openings is reused, so that the quick-swapping battery pack 100 has a compact structure and high space utilization.

By adopting the technical solution in the above embodiment and making full use of the height space below the longitudinal beam, when the battery swapping device disassembles the quick-changing battery pack, the empty battery swapping device can directly enter the space below the quick-changing battery pack without interfering the bottom of the electric vehicle: when the battery swapping device installs the quick-swapping battery pack, the battery swapping device carrying the quick-swapping battery pack can also directly enter the bottom of the longitudinal beam for battery swapping, and does not interfere with the bottom of the electric vehicle. During the whole process, there is no need to lift the vehicle body, and it is not necessary to set up a sunken space or dig a pit for the entry and exit of battery swapping device, which reduces the cost, time and difficulty of building a battery swapping station, reduces the requirements for the construction site, and improves the efficiency of battery swapping.

Although the specific implementation of the present invention has been described above, those skilled in the art should understand that this is only an example, and the protection scope of the present disclosure is defined by the appended claims. Those skilled in the art can make various changes or modifications to these embodiments without departing from the principle and essence of the present invention, but these changes and modifications all fall within the protection scope of the present invention.

What is claimed is:

1. A quick-swapping battery pack, which is removably provided on a longitudinal beam of an electric vehicle, wherein a top of the quick-swapping battery pack is provided with a groove, the quick-swapping battery pack comprises a battery pack box and a battery cell, the battery pack box is provided with a plurality of locking connection structures, and the plurality of locking connection structures are all located in the groove, and the battery pack box is provided with a plurality of battery cell accommodating cavities for placing battery cells, at least some of the cell accommodating cavities are distributed on both sides of the groove, and the battery pack box is connected to the longitudinal beam by the plurality of locking connection structures;
   a bottom of the battery pack box is provided with a plurality of unlocking guiding grooves, and the unlocking guiding grooves penetrate from the bottom of the battery pack box to the groove, and the unlocking guiding grooves are used for allowing an unlocking device to pass through to realize unlocking of the locking connection structure, or allowing the locking structure on the longitudinal beam to pass downward through the unlocking guiding grooves to realize unlocking of the locking connection structure by the unlocking device.

2. The quick-swapping battery pack as claimed in claim 1, wherein the plurality of battery cell accommodating cavities are sequentially arranged at intervals along the horizontal direction.

3. The quick-swapping battery pack as claimed in claim 1, wherein the plurality of battery cell accommodating cavities comprise a plurality of side battery cell accommodating cavities, and the plurality of side battery cell accommodating cavities are distributed on either side of the groove.

4. The quick-swapping battery pack as claimed in claim 3, wherein the plurality of battery cell accommodating cavities further comprise a central battery cell accommodating cavity, which is arranged in a middle area of the battery pack box, and the plurality of side battery cell accommodating cavities are distributed on both sides of the central battery cell accommodating cavity, and the groove is formed between the central battery cell accommodating cavity and the side battery cell accommodating cavity;
   the height of the central battery cell accommodating cavity is smaller than the height of the side battery cell accommodating cavity.

5. The quick-swapping battery pack as claimed in claim 1, wherein, the plurality of locking connection structures are respectively provided on a side wall of the groove and are used for connecting to a side wall of the longitudinal beam;
   and/or, the locking connection structure is provided at a bottom of the groove and is used for connecting to a bottom of the longitudinal beam.

6. The quick-swapping battery pack as claimed in claim 1, wherein the groove is used for avoiding the longitudinal beam.

7. The quick-swapping battery pack as claimed in claim 1, wherein the locking connection structure is a locking shaft, and the locking shaft is connected into a connecting groove of the longitudinal beam.

8. The quick-swapping battery pack as claimed in claim 7, wherein the locking shaft extends from a side wall of the groove towards a middle of the quick-swapping battery pack.

9. The quick-swapping battery pack as claimed in claim 7, wherein two ends of the plurality of locking shafts are respectively connected to two inner walls of the groove.

10. The quick-swapping battery pack as claimed in claim 1, wherein the quick-swapping battery pack further comprises a mounting bracket, and the plurality of locking connection structures are all arranged on the mounting bracket and the mounting bracket is installed on the battery pack box.

11. The quick-swapping battery pack as claimed in claim 1, wherein the quick-swapping battery pack further comprises a plurality of guiding and positioning mechanisms, and the plurality of guiding and positioning mechanisms are arranged on the battery pack box.

12. The quick-swapping battery pack as claimed in claim 11, wherein the plurality of guiding and positioning mechanisms are arranged on a side wall of the groove.

13. The quick-swapping battery pack as claimed in claim 12, wherein the plurality of guiding and positioning mechanisms comprise a plurality of initial positioning mechanisms, and the plurality of initial positioning mechanisms are respectively arranged at intervals on the battery pack box, the plurality of initial positioning mechanisms provide initial positioning guidance for the quick-swapping battery pack, so that an opening of the groove is aligned with the longitudinal beam.

14. The quick-swapping battery pack as claimed in claim 13, wherein the plurality of initial positioning mechanisms are located on same side as the plurality of locking connection structures.

15. The quick-swapping battery pack as claimed in claim 13, wherein the plurality of guiding and positioning mechanism comprises a plurality of precise positioning mechanisms, and the plurality of precise positioning mechanisms are respectively arranged at intervals in the battery pack box, the plurality of precise positioning mechanisms perform precise positioning guidance on the quick-swapping battery pack, so as to position the quick-swapping battery pack on the longitudinal beam;
   the plurality of precise positioning mechanisms and the plurality of initial positioning mechanisms are respectively located on opposite sides.

16. The quick-swapping battery pack as claimed in claim 11, wherein the guiding and positioning mechanism is an elastic positioning mechanism.

17. The quick-swapping battery pack as claimed in claim 1, wherein a
   a bottom of the unlocking guiding groove has an inclined guiding surface.

18. The quick-swapping battery pack as claimed in claim 1, wherein the battery pack box is also provided with a plurality of wire passage slots for cable routing, and the wire passage slot is located below the groove, and is connected to the two adjacent battery cell accommodating cavities; and/or, there is an opening at a top of the battery cell accommodating cavity, and the quick-swapping battery pack also comprises a box cover, the box cover is connected to the battery pack box and is used for covering the opening of the battery cell accommodating cavity.

19. The quick-swapping battery pack as claimed in claim 18, wherein the groove is located between the two adjacent openings.

20. An electric vehicle, wherein the electric vehicle comprises the quick- swapping battery pack as claimed in claim 1.

* * * * *